United States Patent
Reep

(10) Patent No.: US 6,327,569 B1
(45) Date of Patent: *Dec. 4, 2001

(54) SYSTEM AND METHODS FOR REAL TIME LINKAGE BETWEEN HARVEST ENVIRONMENT AND MARKETPLACE

(75) Inventor: Paul J. Reep, Idaho Falls, ID (US)

(73) Assignee: Milestone Technology, Inc., Blackfoot, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,222

(22) Filed: Oct. 15, 1998

(51) Int. Cl.$^7$ .................................................. G06F 17/60
(52) U.S. Cl. ..................................... 705/1; 702/2; 705/37
(58) Field of Search ............................. 705/1, 7, 8, 37, 705/500; 702/2; 460/7

(56) References Cited

U.S. PATENT DOCUMENTS

| Re. 35,100 | 11/1995 | Monson et al. ....................... 111/130 |
| 4,630,773 | 12/1986 | Ortlip ........................................ 239/1 |
| 4,777,835 | 10/1988 | Rusch et al. ........................... 73/866 |

(List continued on next page.)

FOREIGN PATENT DOCUMENTS

WO 00/22563
A1 * 4/2000 (WO).

OTHER PUBLICATIONS

"Milestone Technology, Inc's Grain Analyzer" retrieved from the Internet: <URL: http://www.milestonetechnology.com/products> on Aug. 6, 2001.*

"ESSO Farm–Tek Advances: Innovative Protein Monitoring" dated Apr. 22, 1998 and retrieved from the Internet: <URL: http://www.esso–farm–tek.com/Spring1998/protein.html> on Aug. 6, 2001.*

"Case, Textron Developing In–Field Grain Analyzers," vol. 19, No. 10, dated Oct. 1999, retrieved from the Internet: <URL: http://www.geaps.com/ingrain/99> on Aug. 6, 2001.*

Cattrell, Diane, "Earthly Good from NASA's Space Technology," Future Frontiers, dated May 1, 1999, retrieved from the Internet: <URL: http://www.techlink.msu.montana.edu/articles/futurefrontiers.html> on Aug. 6, 2001.*

(List continued on next page.)

*Primary Examiner*—Tariq R. Hafiz
*Assistant Examiner*—Susanna Meinecke-Díaz
(74) *Attorney, Agent, or Firm*—Kirton & McConkie; Michael F. Krieger

(57) ABSTRACT

Systems and methods are provided for directly linking a harvest environment using precision farming techniques to the marketplace. It is a feature of this invention that properties of crops are evaluated "on-the-move," during the harvest thereof, and are made known to users in the harvest environment to enable the real-time transaction for the sale of these crops. In a preferred embodiment, crops are harvested from an agricultural field in the harvest environment with a combine having an auger section thereon. A plurality of properties of the crops are evaluated on-the-move by flowing the harvested crops through the auger section and over an optical device. The optical device utilizes light reflected from the crops to determine the properties. Thereafter, the marketplace is searched with a computing configuration aboard the combine for a market seeking the crop properties. If a market is found, a wireless communication link between the harvest environment and the market is used to transact for a sale of the crops. The properties of the crops are correlated to a location in the agricultural field to expand the knowledge base about the field to enhance future precision farming operations.

16 Claims, 5 Drawing Sheets

U.S. PATENT DOCUMENTS

| | | | | |
|---|---|---|---|---|
| 4,819,176 | * | 4/1989 | Ahmed et al. | 364/468 |
| 5,173,079 | * | 12/1992 | Gerrish | 460/7 |
| 5,220,876 | | 6/1993 | Monson et al. | 111/130 |
| 5,327,708 | * | 7/1994 | Gerrish | 56/1 |
| 5,355,815 | | 10/1994 | Monson | 111/200 |
| 5,467,271 | | 11/1995 | Abel et al. | 364/420 |
| 5,541,848 | * | 7/1996 | McCormack et al. | 364/478.01 |
| 5,558,984 | | 9/1996 | Young et al. | 435/3 |
| 5,566,073 | | 10/1996 | Margolin | 364/449 |
| 5,668,719 | | 9/1997 | Bobrov et al. | 364/420 |
| 5,684,476 | | 11/1997 | Anderson | 340/988 |
| 5,689,418 | | 11/1997 | Monson | 364/420 |
| 5,721,679 | | 2/1998 | Monson | 364/424 |
| 5,741,983 | | 4/1998 | Skotnikov et al. | 73/864 |
| 5,751,421 | * | 5/1998 | Wright et al. | 356/328 |
| 5,845,229 | * | 12/1998 | Rawlings | 702/2 |
| 5,902,343 | * | 5/1999 | Hale et al. | 701/50 |
| 5,938,709 | * | 4/1999 | Hale et al. | 701/50 |
| 5,978,771 | * | 11/1999 | Vandivier, III | 705/8 |
| 5,991,025 | * | 11/1999 | Wright et al. | 356/328 |
| 5,995,894 | * | 11/1999 | Wendte | 701/50 |
| 6,029,106 | * | 2/2000 | Hale et al. | 701/50 |
| 6,061,618 | * | 5/2000 | Hale et al. | 701/50 |

OTHER PUBLICATIONS

"AgriLogic™ Software Suite Integrates Case IH Precision Farming," Press Release from Case IH Agriculture Equipment, dated Mar. 12, 1998, retrieved from the Internet: <URL: http://www.casecorp.com/agricultural/press/980312a.html> on Aug. 6, 2001.*

"Case and Textron Systems Developing Mobile Continuous–Flow Grain Analyzer," Technology News from @glnnovatorOnline news files, dated Aug. 16, 1999, retrieved from the Internet: <URL: http://www.agriculture.com/technology/> on Aug. 6, 2001.*

Long, D.S., R.E. Engel, & P. Reep, "Grain Protein Sensing to Identify Nitrogen Management Zones in Spring Wheat," Site–Specific Management Guidelines (SSMG–24), file last modified on Jul. 29, 1999.*

Cattrell, Diane, "NASA Provides Technology of the Future to American Farmers Today," AGRInews, dated Feb. 5, 1999, retrieved from the Internet: <URL: http//techlink.msu.montana.edu/articles/agrinews.html> on Aug. 6, 2001.*

Von Rosenberg, Jr., Chas. et al., "A Rugged Near–Infrared Spectrometer for the Real–Time Measurement of Grains During Harvest," Spectroscopy, 15(6), pp. 34–39, dated 2000, retrieved from the Internet: <URL: http://www.spectroscopymag.com> on Aug. 6, 2001.*

"ProSpectra™ Grain Analyzer: Rugged and Compact Spectrometer for Real–Time Grain Analysis," Textron Systems, retrieved from the Internet: <URL: http://www.systems.textron.com/grain.htm> on Aug. 6, 2001.*

* cited by examiner

SYSTEM AND METHODS FOR REAL TIME LINKAGE BETWEEN HARVEST ENVIRONMENT AND MARKETPLACE

BACKGROUND OF THE INVENTION

1. The Field of the Invention

The present invention relates generally to precision agricultural systems and methods. More specifically the present invention relates to directly linking a harvest environment employing precision agricultural systems and methods to the marketplace. Even more specifically, the present invention relates to linking the harvest environment to the marketplace for conducting real time transactions of crops harvested from the harvest environment.

2. The Relevant Technology

The sequence of events that brings crops to the marketplace conventionally includes four phases. In the first phase, a farmer prepares an agricultural field, plants and harvests crops from the field and transports them to an elevator for storage. The second phase includes the warehousing of the crops while a brokerage house transacts for the stored crops. In the third phase, the crops are transported to a manufacturer such as a mill where they are transformed into various consumer goods such as foodstuffs and food-based products. The fourth phase includes the selling of the consumer goods to an end user for consumption or use.

In preparing an agricultural field a farmer typically samples the soil before, and frequently during, the growing season at predetermined locations (e.g. grids) throughout the field to determine its soil type and percentage of nutrient content. Once determined, a fertilizer prescription indicating relative amounts of nutrient requirements is devised for the agricultural field as a function of the crop to be planted therein. At some appropriate time in relation to the growing season of the crop the fertilizer prescription is applied to the field achieve greater harvests.

Although developing a fertilizer prescription in this manner has been used extensively by farming operations for decades, the taking and analysis of soil samples is time consuming and labor intensive. This is especially true with farming operations having numerous agricultural fields requiring soil sampling.

Regardless of where in a field soil samples are taken from, and no matter how accurate the analysis, soil samples taken in the foregoing manner are, at best, incomplete representations of the nutrients in an agricultural field. This is because the samples are only taken at a few select locations. Thus, to achieve a nutrient map indicating relative amounts of nutrient content in an agricultural field, and ultimately a fertilizer prescription, the analyzed soil samples must be interpolated for regions in the field where no samples were taken. Although still heavily relied upon by many farming operations, the soil samples only provide an informed guess as to the actual amount and composition of the nutrients.

In an effort to minimize some of the time required to obtain an understanding of the nutrient content in a field, and ultimately the time required to understand appropriate fertilizer requirements, farming operations often consult tabular data compiled by agronomists. Since this data is compiled according to "general" field characteristics, it is often strongly criticized as being too generic and not capable of providing meaningful impact upon any specific farming operation. This data has also been criticized as being less-than indicative of "real-world" growing environments because the data is frequently generated from "closed" environments, such as greenhouses and terrariums.

In contrast, if the farming operation is "precision" based, it is not uncommon to have soil samples taken and analyzed for every few feet of a multiple-acre agricultural field. Although this requires little or no interpolation to obtain an understanding of the nutrient content for a field, this method trades poor accuracy obtained from random or sparse soil sampling for increases in time and labor expense. As a result, this can be overly expensive for farming operations having numerous agricultural fields requiring precise soil sampling.

Consequently, mere use of soil sampling and tabular data to obtain a detailed understanding of the nutrient content in a particular agricultural field either lacks in details and precision or is obtained as a result of tremendous capital expenditure in time and labor.

Moreover, since it is known that fertilizer production is a colossal consumer of invaluable energy resources, farming operations that apply fertilizer to a particular location in an agricultural field without an accurate understanding of the nutrient requirements of that location not only waste fertilizer and capital resources for the fertilizer, but also cause society to suffer because of the unnecessary expenditure of energy resources in the production thereof. Poorly applied fertilizer also potentially creates environmental problems because of excessive run off, for example. With such a fragile ecosystem, these practices are unacceptable.

An industry-wide awareness of this and other problems has spawned intensive data collections for individual fields according to numerous and wide-ranging field characteristics. It is believed that with more data and information, more understanding of fertilizer or watering requirements is achieved and waste is prevented. As an example, it is now not uncommon for a farming operation using precision agricultural methods to generate extensive data on field characteristics such as micronutrients like boron and manganese, wind and water erosion, drainage, field histories, pH, lime, irrigation, predicted rainfall and topographical characteristics of the field, to name but a few.

Disadvantageously, however, these collections of data require even more time and money. One reason is because more soil sampling and analysis is required. Another reason is because various charts, such as topographical relief and rainfall charts, must be obtained and analyzed in combination and separately. Still another reason is because sophisticated computer software is required to interpret the vast amounts of data collected from a singular field.

Within the prior art still other techniques are used to determine field nutrient contents to assist in the development of a fertilizer prescription. These techniques, known commonly as variable rate technology (VRT), are primarily used to dispense substantially precise amounts of blended fertilizer compositions onto geographically small regions of an agricultural field.

In U.S. Pat. Nos. 4,700,895, 5,220,876, 5,355,815 and 5,689,418, all having common assignee Ag-Chem Equipment Co., Inc., of Minnesota, for example, exemplary VRT methods and apparatus are described that determine field nutrient contents and apply a unique fertilizer prescription to an agricultural field. In general, these patents combine to teach fertilization for a particular field by: (i) utilizing a soil map, particularized to the field, stored on-board a dispensing truck that is used to distribute the fertilizer; (ii) obtaining "real-time" soil samples from a soil sampler attached to the truck for supplementing and updating the soil map; and (iii) real-time variably adjusting the fertilizer blend from various nutrient bins stored upon the truck before distribution onto the field in order to "optimize" the fertilizer prescription.

While perhaps effective for dispensing substantially accurate fertilizer prescriptions, this VRT technology is extremely expensive for determining nutrient requirements of a field. The salient reason for the expense is because the dispensing trucks are extremely complex in function. Thus only wealthy farming operations are even able to afford such a means for determining nutrient contents.

Determining nutrient contents in this manner is also problematic because soil samples must still be taken and analyzed. Although sampling and analysis is performed "on-the-go" as the dispensing truck moves through the field, it would be an advance to eliminate reliance upon soil sampling because customized moving samplers, hence expensive samplers, must be employed on these trucks.

Regardless of whether the soil sampling of the field is precision based, VRT or conventional, these methods provide little indication, if any, of the nutrient content of the crops that are eventually harvested from these fields. Since manufacturers frequently require crops having specific nutrient content for various commodities, farmers are unable to accurately ascertain the fair market value for their crops. Thus, the farmers are economically at the mercy of the storage elevators and the brokerage houses.

Moreover, even if the fair market value of a harvested crop is known, crops awaiting purchase that are stored in an elevator are subject to risks such as loss or destruction. In turn, these risks are passed on to the farmers when storage elevators purchase the crops for a monetary figure less than their fair market value.

Another problem is that by the time the crops harvested from an agricultural field are purchased, transported and transformed into various consumer goods, numerous "middlemen," such as the storage elevator, the brokerage house, cargo personnel who transport the crops, etc., have reduced the money that could have been originally paid to the farmer.

Accordingly, it would be an advance to provide simplified and inexpensive, yet accurate, methods of determining nutrient content of crops harvested from an agricultural field so that farmers could determine in real time the economic value of their crops and bypass middlemen who reduce their potential economic benefits. Relatedly, determining fertilizer requirements for these crops in a manner more precise and unexpensive than those previously described would also result in an increased economic benefit to the individual and to society.

OBJECTS AND SUMMARY OF THE INVENTION

It is, therefore, an object of the present invention to provide systems and methods for improving crop transactions between the harvest environment and the marketplace It is another object of the present invention to provide systems and methods useful in preventing unnecessary expenditures of energy resources in the overproduction of fertilizer.

It is still another object of the present invention to provide systems and methods for directly linking the harvest environment to the marketplace.

It is yet another object of the present invention to provide systems and methods for improving crop production.

It is still yet another object of the present invention to provide systems and methods for evaluating properties of crops harvested from an agricultural field in a harvest environment substantially simultaneously with the harvest thereof.

It is a further object of the present invention to provide systems and methods for determining nutrient content and requirements for an agricultural field without reliance upon soil sampling.

It is an even further object of the present invention to provide systems and methods for generally improving precision farming techniques and to improve techniques particular to a specific agricultural field.

It is still a further object of the present invention to provide systems and methods for economically improving the introduction of crops into the marketplace.

It is a concomitant object of the present invention to provide systems and methods for economically improving farming operations.

In accordance with the invention as embodied and broadly described herein, the foregoing and other objectives are achieved by providing systems and methods for directly linking a harvest environment using precision farming techniques to the marketplace. It is an advantage of some embodiments of this invention that properties of crops are evaluated "on-the-move," during the harvest thereof, and are made known to users in the harvest environment to enable the real-time transaction for the sale of these crops.

In a preferred embodiment, crops are harvested from an agricultural field in the harvest environment with a combine having an auger section thereon. A plurality of properties of the crops are evaluated on-the-move by flowing the harvested crops through the auger section and over an optical device. The optical device utilizes light reflected from the crops to determine the properties.

Thereafter, the marketplace is searched with a computing configuration aboard the to combine for a market seeking one or more of the crop properties. If a market is found, a wireless communication link between the harvest environment and the market is used to transact for a sale of the crops.

The properties of the crops are correlated to a location in the agricultural field to expand the knowledge base about the field to enhance future precision farming operations. In particular, precise fertilizer requirements are obtained from the crop properties in a manner unrelated to the taking and analyzing of soil samples to prevent the misuse of fertilizer overproduction. Preferably, these properties are correlated to the field by using a positioning system such as a GPS.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates generally to precision agricultural systems and methods to directly link a harvest environment to the marketplace. It is a feature of this invention that properties of crops are evaluated "on-the-move," during the harvest thereof, with precision farming techniques so that these properties are known to users in the harvest environment in order to real-time transact for the sale of the crops from the harvest environment to the marketplace. In this manner, economic benefit is achieved for the farming operation by excluding the economic burden imposed thereupon by "middlemen" such as the storage elevator and/or brokerage house. These properties are evaluated and correlated to the specific agricultural field from which the crops were harvested so that future precision farming systems and methods are even further enhanced.

It is another feature of this invention that this correlation of crop properties to the agricultural field can readily provide an accurate understanding of fertilizer requirements without requiring the conventional taking and analyzing of soil samples.

In the context of this invention, the foregoing and other principles will preferentially be described in relation to a wheat crop planted and harvested from an agricultural field. The wheat crop, however, should not be construed as limiting and crop may refer to any grain, vegetable, bean, plant, etc. from which properties may be evaluated upon the harvesting thereof.

Figure 1:
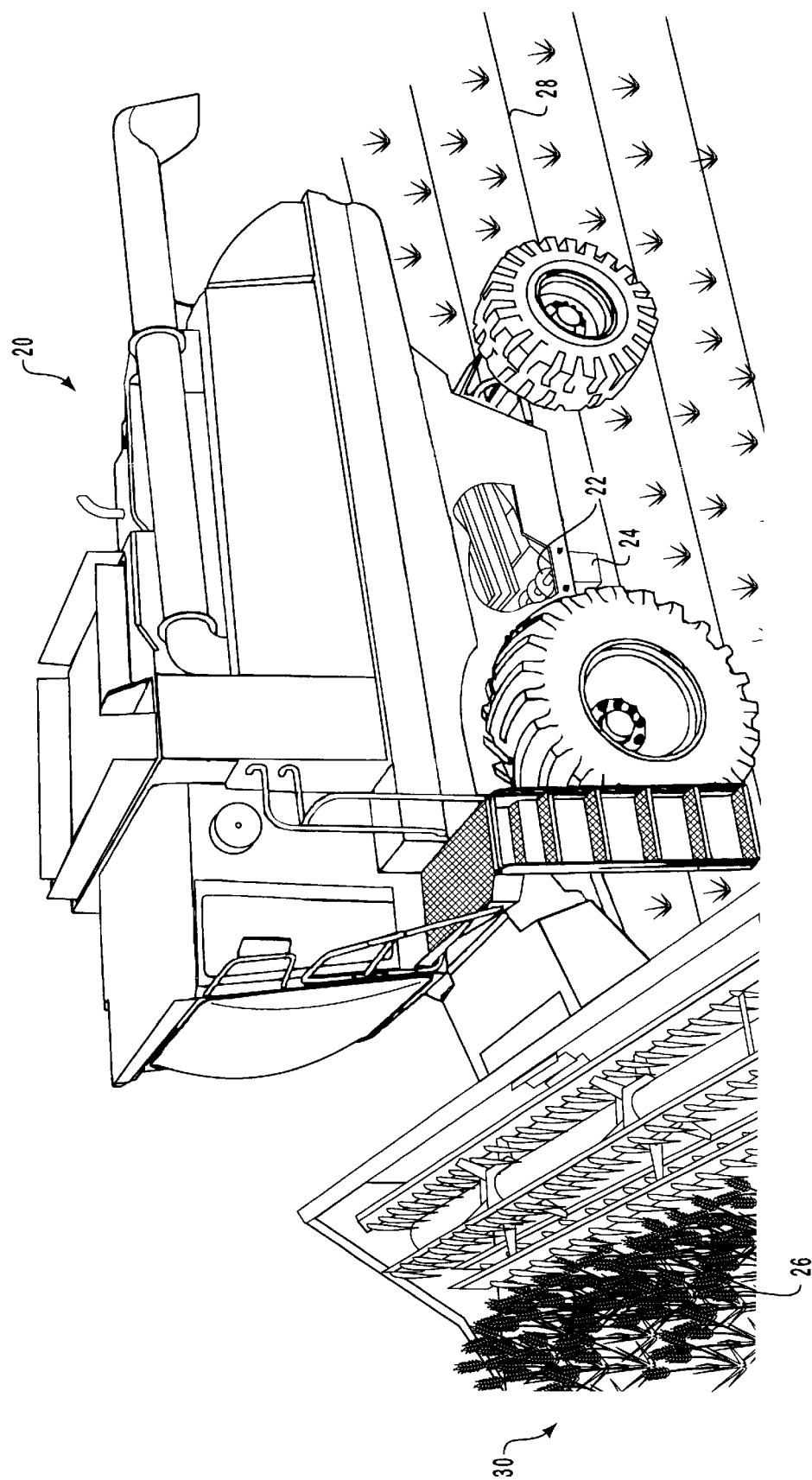
FIG. 1 is a perspective view of an exemplary harvest environment having a harvesting device with a partial cutaway section depicting means for evaluating properties of a crop in accordance with the present invention during the harvesting thereof.

With reference to FIG. 1, a harvesting device, embodied as a combine because of its preferred use in the harvest of a wheat crop, is depicted generally as 20. The combine comprises an auger section 22 well known in the art. Attached to the auger section in a substantially non-intrusive manner is an optical device 24. One preferred optical device is the known Milestone Monitor. This preferred optical device is a multi-spectral device, preferably near infrared, that can be used to measure a variety of properties of a wheat crop 26 upon its harvesting from an agricultural field 28. In a preferred use, the optical device measures the protein content of the wheat crop as the wheat crop flows past the optical device by emitting light through a small hole and correlating reflected light with protein characteristics. In one preferred embodiment, the optical device is attached to a pipe wall of the clean grain elevator of the combine where light is emitted through a small hole in the pipe. Other preferred properties of the crop that can be evaluated by this and other devices include, but are not limited to, a carbohydrate content, an oil content, a fat content, a starch content and a glucose content.

Figure 2:
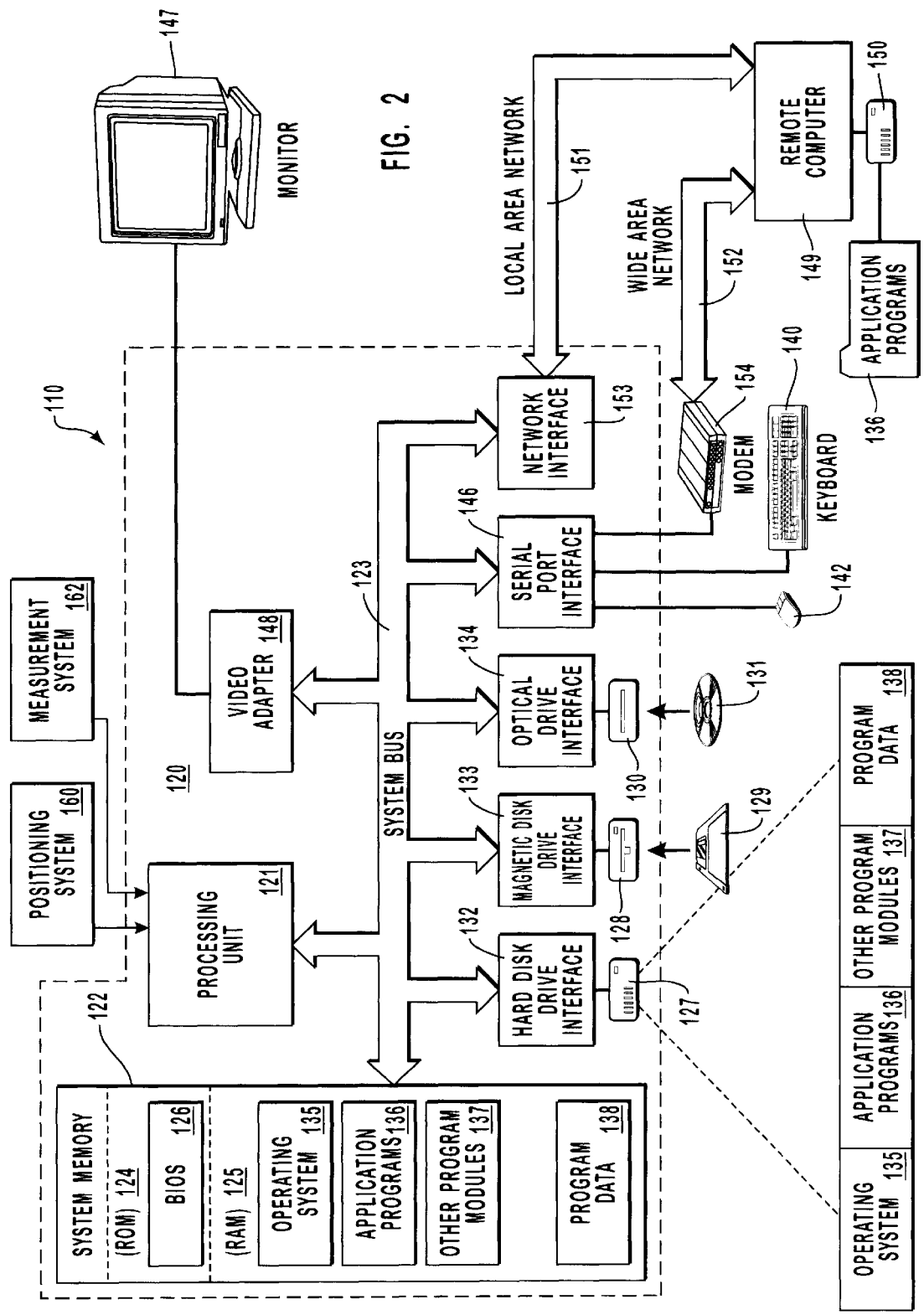
FIG. 2 is an exemplary computing system configuration for providing a suitable operating environment for linking the harvest environment of FIG. 1 to a marketplace.

Also aboard the combine, and described more fully in relationship to FIG. 2, is a computing system configuration for processing the properties of the crop evaluated by the optical device.

Although not shown, the combine is additionally preferably equipped with an on-board positioning system such as a global positioning system (GPS) for use as described subsequently.

Together the foregoing represents a harvest environment, generally as 30. Prior art harvest environments have heretofore been unable to directly link together with the marketplace because of: (i) their inability to ascertain the properties of their crops; and (ii) their inability to physically link together with the marketplace. Thus, prior art harvest environments required the passage of their crops to a storage elevator where they awaited brokerage to the marketplace as described in the background section.

However, with the ever evolving nature of new products such as drugs, energy resources, foodstuffs, etc., it is now more critical that the properties of crops not only be known, but separated accordingly. In this manner, manufacturers are able to begin their development of these products with crops having known properties and need not waste time and resources sorting them.

For example, it is now common for various chemical-based markets to contract for crops having a certain percentage of oil content in the crops because this improves the final product. Such products include various oils, adhesives, chemicals, solvents, etc. In a similar manner, other markets in the marketplace, such as commodity markets and specialty markets, seek crops having various separated and/or blended properties that contribute to some predetermined desired characteristics.

In contrast to the prior art, the harvest environment 30 of the present invention has the ability to real-time process the properties of the crops as they are harvested to provide a real-time understanding of the combined properties of all the crops in the agricultural field to form a characteristic thereof. In this manner, the harvest environment is equipped with necessary information, heretofore unknown to the harvest environment, and may directly transact with a market of its choosing that seeks such crop characteristics.

With reference to FIG. 2 an exemplary computing system configuration is depicted for: (i) processing properties of crops; (ii) searching the marketplace for a market seeking desired crop properties and/or characteristics; and (iii) transacting with crops in the market of its choosing. In this figure, the system providing a suitable operating environment for the present invention is depicted generally as 110. It should be appreciated that system 110 may be either implemented aboard the harvesting device, such as combine 20, as a partial or full integration or may be implemented at a site remote from the agricultural field yet still within the harvest environment such as a home base for the farming operation. It is possible that the system 110 may also be implemented as a combination between the harvesting device and the remote site.

In general, FIG. 2 is used to provide a brief, generic description in which either the structure or processing of embodiments is used in implementing the methods of the present invention. Using this figure in this manner to present the invention, however, should not be construed as limiting of its scope but merely as representative. Since the following may be computer implemented, particular embodiments may range from computer executable instructions as part of computer readable media to hardware used in any or all of the following depicted structures. Implementation may additionally be combinations of hardware and computer executable instructions When described in the context of computer readable media having computer executable instructions stored thereon, it is denoted that the instructions include program modules, routines, programs, objects, components, data structures, etc. that perform particular tasks or implement particular abstract data types upon or within various structures of the computing environment. Executable instructions exemplarily comprise instructions and data which cause a general purpose computer, special purpose computer, or special purpose processing device to perform a certain function or group of functions.

The computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. For brevity, computer readable media having computer executable instructions may sometimes be referred to as "software."

With reference to FIG. 2, the system for implementing the invention includes a general purpose computing device in the form of a conventional computer 120. The computer 120 includes a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help to transfer information between elements within the computer 120, such as during start-up, may be stored in ROM 124. The computer 120 may also include a magnetic hard disk drive 127 for reading from and writing to a hard disk, not shown, a magnetic disk drive 128 for reading from or writing to a removable magnetic disk 129, and an optical disk drive 130 for reading from or writing to removable optical disk 131 such as a CD-ROM or other optical media. The hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions, data structures, program modules and other data for the computer 120.

Although the exemplary environment described herein employs a hard disk, a removable magnetic disk 129 and a removable optical disk 131, it should be appreciated by those skilled in the art that other types of computer readable media which can store data accessible by a computer include magnetic cassettes, flash memory cards, digital video disks, Bernoulli cartridges, random access memories (RAMs), read only memories (ROM), and the like.

Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage which contains information that is locally available to the computer system. The second category is remote storage which includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through input or interface selection devices such as a keyboard 140 and pointing device 142. Other input devices (not shown) may include a microphone, joy stick, game pad, satellite dish, scanner, or the like. These and other input devices are often connected to the processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as video adapter 148. In addition to the monitor, computers often include other peripheral output devices (not shown), such as speakers and printers. Scanner peripheral devices (not shown) for reading imagery into the computer are often also included.

In linking to the marketplace, the computer 120 may operate in a networked environment using logical connections to one or more other computing configurations represented entirely as remote computer 149. Remote computer 149 may be a personal computer, a server, a router, a network PC, a peer device or other common network node, and typically includes many or all of the elements described above relative to the computer 120, although only a memory storage device 150 has been illustrated in FIG. 2. The logical connections depicted in FIG. 2 between the computer 120 and the remote computer 149 include a local area network (LAN) 151 and a wide area network (WAN) 152 that are presented here by way of example and not limitation. Such networking environments are commonplace when enterprising wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the local or remote memory storage devices and may be linked to various processing devices for performing certain tasks. In communicating from the harvest environment to the marketplace, it is preferred that the system link wirelessly over these networks via known wireless transmission schemes although such wireless apparatus are not shown in connection with the harvest device or harvest environment. It will be appreciated that the network connections shown are exemplary and other means of establishing a communications link between the computers may be used.

During use, as the crop is harvested and flowed over the optical device, the appropriate locations in the agricultural field where crops are planted and/or harvested from are supplied to the processing unit 121 via a positioning system component 160. The positioning system component is preferably a Global Positioning Satellite (GPS) based system providing known and accurate geographical referencing.

In a similar manner, specific properties of the harvested crop are supplied via a measurement device component 162 to the processing unit 121. Again, the preferred measurement device is an optical device previously described.

As described hereinafter, crop properties and the searching of the marketplace can be displayed or provided to a user in the harvest environment by means such as the monitor 147, magnetic, optical or hard disks or peripheral output devices such as the printer, for example.

Those skilled in the art will appreciate that the invention may be practiced with other computing system configurations, including hand-held devices, multi-processor systems, microprocessor-based or programmable consumer electronics, network PCs, minicomputers, computer clusters mainframe computers, and the like.

Figure 3:
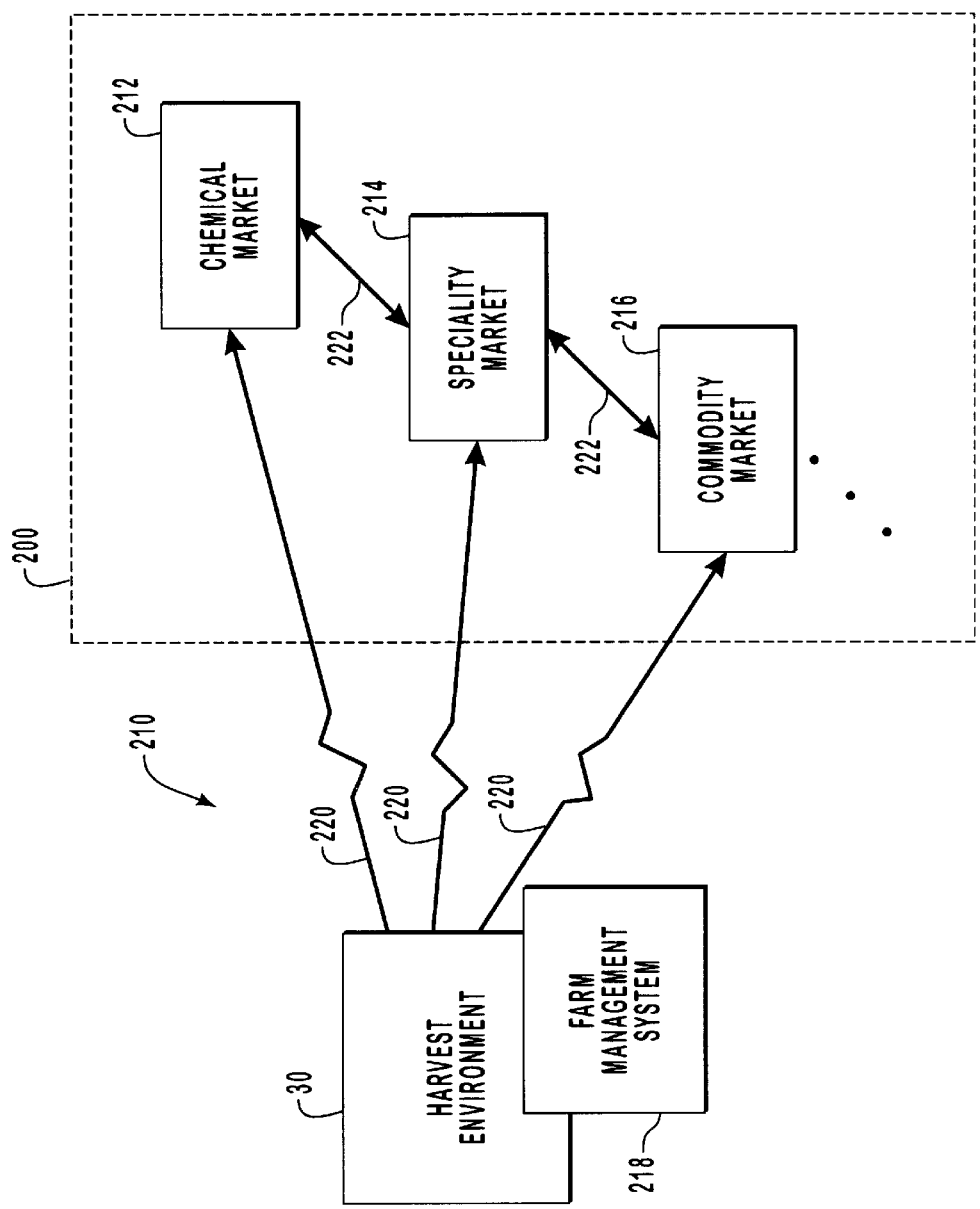
FIG. 3 is a diagram of the overall hierarchy for directly linking a harvest environment and a marketplace in accordance with the present invention.

With reference to FIG. 3, an overall system for directly linking the harvest environment 30 to the marketplace 200 is depicted generally as 210. In this figure, the marketplace 200 is represented by a chemical market 212, a specialty market 214 and a commodity market 216. Also linked to the harvest environment is a farm management system 218. Preferably, each of the markets in the marketplace is wirelessly linked to the harvest environment via the preceding computing system configuration as indicated by the communication channels 220. It will be appreciated that each of the markets may be individually linked to the harvest environment or via each other as indicated by communication links 222.

The chemical market 212 is indicative of those markets seeking crops for products such as adhesives, solvents, chemicals, oils, etc. The specialty market 214 is indicative of those markets seeking crops having segregated or isolated properties such as various percentages or content of protein, oil, carbohydrates, fat, etc. The commodity market 216 is indicative of those markets seeking crops having various blended percentages or content of crop properties. The preceding markets, however, should not be construed as limiting for other markets and/or other users are also within the scope of this invention and are indicated by the ellipses within the marketplace 200. For example, additional links to the harvest environment include causing a direct link to a storage elevator or to a particular end user like a manufacturer of a certain product. The farm management system 218 is indicative of those precision farming techniques particular to a specific agricultural field that use the individual crop properties or overall crop characteristics in order to even further enhance future crop properties. Subsequently, an example of this will be described.

Figure 4:
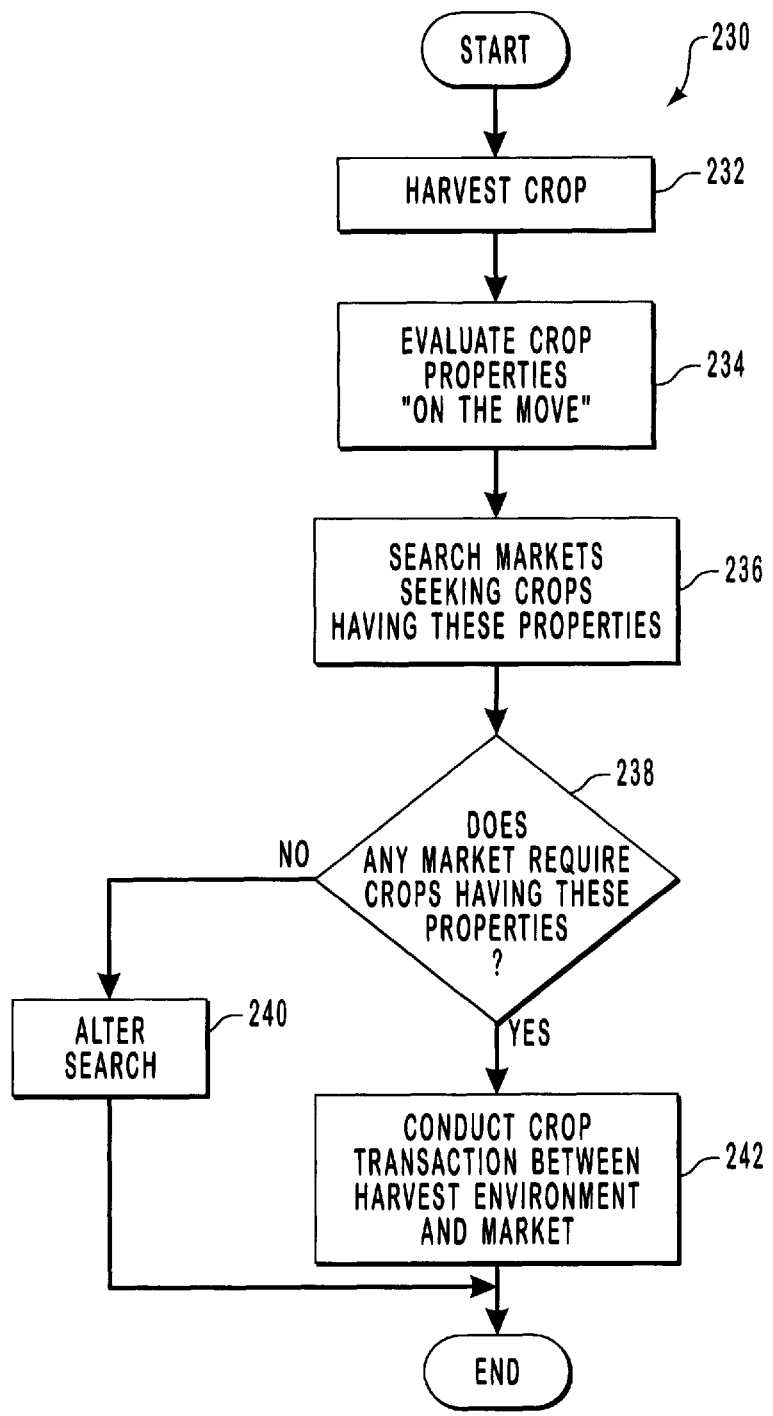
FIG. 4 is a flow diagram of the hierarchical operation for directly linking the harvest environment and the marketplace of FIG. 3.

The overall hierarchy for directly linking, in real-time, a harvest environment with the marketplace is indicated in FIG. 4 generally as 230. At step 232 a crop in the agricultural field is harvested within the harvest environment. At step 234, various properties of the crop are evaluated "on-the-move." It will be appreciated that just as each individual crop has a property, so too does the combination of all the crops in the agricultural field. The present invention provides for assembling the properties of the crop into a characteristic of all the crops in the agricultural field, thereby providing the overall characteristics of an entire crop in a field as a whole. For example, one stalk of wheat might possess a protein content of 45% while the accumulation of all wheat stalks in that field yield a wheat crop having a protein content of 35%. As used herein, each individual crop will possess properties, while the accumulated or aggregate crop for the field will possess characteristics. For brevity, however, the remaining discussion will focus on properties but it is assumed that such also includes crop characteristics. As before, these properties are preferably evaluated by an optical device on a harvest device, such as a combine, and may include, but are not limited to, protein, starch, fat, carbohydrate, oil, glucose, vitamins, minerals, etc. In a preferred embodiment, crops having similar properties are separated and grouped directly on the harvest device.

Thereafter, at step 236 the marketplace is searched from the harvest environment for a market desirous of one or more of these properties. Again, this is preferably accomplished with a computing system configuration as previously described. If, at step 238, a market is not found that is desirous of these properties, at step 240 the search is altered, such as by expansion, to eventually find such a market.

On the other hand, if a market is found that seeks one or more of the crop properties, then a transaction for the crops is conducted directly from the harvest environment to the market 242. Such transactions will typically include the sale of the crops to some buyer.

While perhaps a straightforward application results by linking the harvest environment to the marketplace, it should be appreciated that the foregoing is heretofore unknown. This is because conventional farming operations have previously never known the properties of their crops, not to mention knowing them in real-time with "on-the-move" sensors, and have thus been incapable of directly brokering deals. In the past if the marketplace was merely seeking a bulk concentration of a wheat crop, for example, it was heretofore the most convenient to just deliver harvested crops to the storage elevator and let various middleman bring the crops to the marketplace. In other words, since prior art harvest environments either lacked necessary understanding or sought the convenience of traditional methods in bringing crops to the marketplace, prior art harvest environments have altogether been prohibited from even appreciating that a need existed to cause a direct link to the marketplace.

As a result, several advantages have been realized. Some of the significant advantages include, but are not limited to: (i) the elimination of middlemen who economically burden farming operations and the marketplace; and (ii) the improvement of the marketplace because crops having known properties are provided directly to markets seeking such properties.

EXAMPLE

The following example is premised upon the recent results published by various inventors at Montana University that correlated protein content in a wheat crop to nitrogen removed from the soil in an agricultural field. As has been intimated in articles *Better Crops with Plant Food*, Potash & Phosphate Institute and Protein, No. 4 (1997) and *Protein on the Go,* Farmer-Stockman, January (1998), expressly incorporated herein by reference, a consistent correspondence exists between grain protein content and applied nitrogen. In particular, these articles expressed that when grain protein content is less than some critical amount (about 13.4%), relative yields are typically less than the maximum yield. In contrast, when grain protein content is greater than or equal to the critical amount, the relative yields are consistently closer to the maximum yield. Hence, if grain protein content of the crop can be measured, the nitrogen amounts required for an agricultural field to yield optimized results can be determined without taking and analyzing soil samples.

Figure 5:
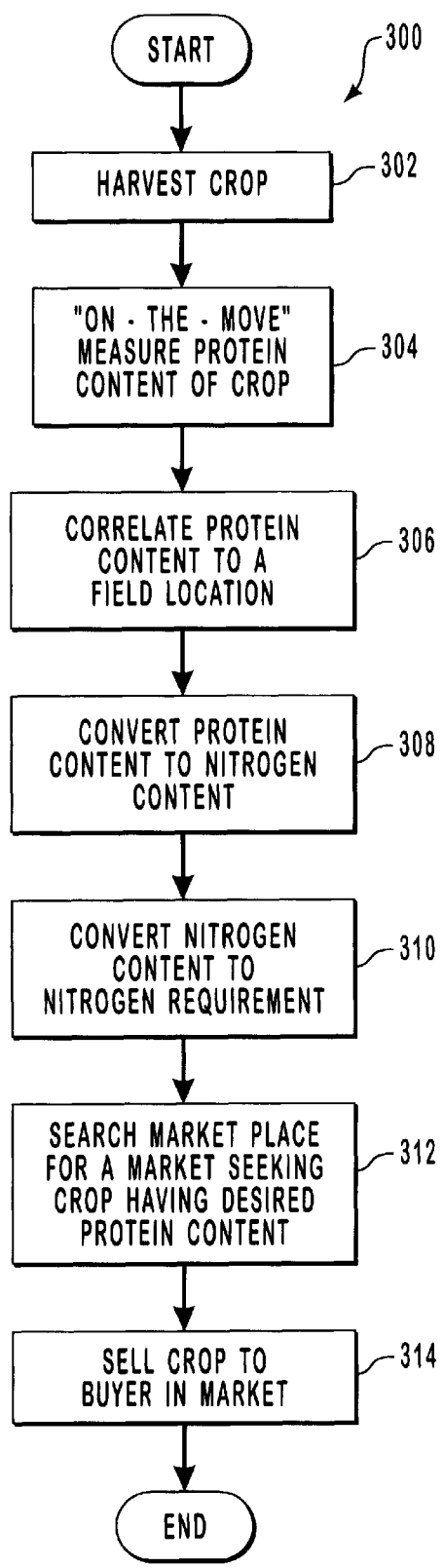
FIG. 5 is a flow diagram of an exemplary illustration for both linking a harvest environment to a marketplace and for determining a nutrient requirement for an agricultural field from a protein content of a crop harvested by a combine equipped with both an optical device and a computing system configuration in accordance with a preferred embodiment of the present invention.

With reference to FIG. 5, a flow diagram of the hierarchical operation of ultimately linking a harvest environment to the marketplace and for improving precision farming techniques as a function of measuring protein content of a wheat crop is depicted in accordance with the present invention generally as 300. In general, the method 300 is an uncomplicated step-wise process that converts protein content of a wheat crop to the nutrient requirements for the agricultural field while selling the wheat crop to a market.

At step 302 the wheat crop planted in the agricultural field is harvested with a combine 20 (FIG. 1). As the combine traverses through the field, the crop passes over the optical device as it flows through the auger section 22. At step 304, the optical device "on-the-move" measures the protein content of the crop.

At step 306 the protein content of the crop is correlated to the present location in the field where the crop was just harvested. Preferably, this is performed by a GPS.

Once the protein content of the crop is obtained from the optical device at step 304, the protein content is converted into a nitrogen content removed from the agricultural field. The conversion of protein content to nitrogen content is accomplished by means of the following preferred mathematical operation:

$$\text{Nitrogen Content Removed} \approx \frac{(\text{Crop Yield} \times \text{Protein Content})}{5.7 \times 100};$$

where crop yield is expressed in pounds per acre and protein content is in percentage. It should be appreciated, however, that variations of the foregoing mathematical operation are within the scope of this invention and can be expressed in various other units, according to various sized regions of the agricultural field.

At step 308, the processor mathematically operates upon the data representing the protein content and converts this to a nitrogen content removed from the agricultural field.

Thereafter, at step 310, the processor converts the nitrogen content removed to the nitrogen requirement by appropriate mathematical operations determining the amount of nitrogen to be added to the nitrogen content removed sufficient enough to attain the critical level of protein content of the crop.

Similar to the protein content, it is preferred that the nitrogen content removed is correlated to the location in the agricultural field where the crop was harvested to provide accurate mapping of the nitrogen content across the field, but it is not necessarily required to be.

In a preferred embodiment, the nitrogen requirement for the field is simply the nitrogen content removed from the field plus an amount of nitrogen added thereto to bring the grain protein content to its critical level. For brevity, the critical level may sometimes be referred to as NCL. In one preferred embodiment, if areas or regions of the field already have levels of nitrogen sufficient to achieve a critical level of protein content, the nitrogen requirements simply equate to the nitrogen content removed.

The preferred mathematical equation expressing the foregoing principles is:

Nitrogen Requirements≈Nitrogen Content Removed+Nitrogen Critical Level (NCL);

where, (NCL)≈(15−Protein Content)×18 (lb) Nitrogen per each 1% Protein Increase.

With respect to a wheat crop, it should be appreciated that the critical level may be adjusted upward from about 13.4% to a value of grain protein content providing increased assurances of attaining the proper relative crop yield. Thus, in a preferred range, the critical level of protein content for wheat ranges from about 13.4% to about 15%. In a similar manner, the foregoing equations can be adjusted depending upon the desired critical level for other crops.

As a result of the foregoing, several advantages have been realized. Some of those advantages include, but are not limited to: (i) prevention of unnecessary expenditures of energy resources in the overproduction of fertilizers because now actual nutrient requirements for a particular field are actually known instead of being unknown or interpolated guesses; (ii) nutrient content and requirements are now able to be ascertained for agricultural fields without requiring soil sampling measurements and analysis which avoids its inherent costs in time and labor; (iii) nutrient content and requirements are now ascertainable in a singular consolidated method instead of being determined by numerous and expensive (time and labor) prior art steps; and (iv) nutrient content and requirements are now known and particularized to an actual agricultural field, thus providing more fertilizer accuracy while substantially eliminating reliance upon generic data such as tabular data.

The further advantage of accurately mapping a nitrogen requirement for a particular field without extensive soil sampling is also realized in the event that protein content, nitrogen content and nitrogen requirements are correlated to a particular location in an agricultural field.

Preferably, the processing unit 121 (FIG. 2) performs the correlation of the protein content, nitrogen content and nitrogen requirements to the proper locations in the field. Another function preferably performed by the processing unit is the mathematical operations necessary to convert or determine the nitrogen content from the protein content. The conversion of the nitrogen content to the nitrogen requirement is similarly performed by the processing unit by determining a sufficient amount of nitrogen to be added to the nitrogen content to attain a critical level of the protein content.

At step 312 the marketplace is searched from the harvest environment for a market seeking a wheat crop having a desired protein content as that obtained in step 304. At step 314 the wheat crop is sold to a buyer in the market.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for directly linking a harvest environment with a marketplace, the steps comprising:

harvesting a crop from an agricultural field in said harvest environment;

electromechanically evaluating at least one property of said crop contemporaneously and continuously with the harvesting thereof;

utilizing a computer and wireless link to real time process the properties of the crops as they are harvested to provide a real-time understanding of the combined properties of all the crops in the agricultural field, and to evaluate in real-time, while on the move and during the harvest, the value of the crop and to separate the properties of said crops;

utilizing a computer and wireless link to automatically contact, without human intervention and during the harvesting of the crop, one or more potential markets through the wireless link; and transacting, automatically and in real-time, with said crop in at least one of the said markets, where said transaction occurs by a direct wireless communication between said computer and said market, said transacting occurring based upon said value and said property of said crops.

2. The method according to claim 1, wherein said potential markets are selected from the group consisting of commodity markets, specialty markets, and chemical markets.

3. The method according to claim 1, wherein said step of transacting with said crop further comprises the step of selling said crop via said market.

4. The method according to claim 1, further comprising the step of assembling said properties of said crop into a characteristic of all said crops in said agricultural field.

5. The method according to claim 1, wherein during said step of harvesting, correlating said at least one property of said crop to a location in said agricultural field continuously in real-time.

6. A method of directly linking a harvest environment with a marketplace determining the nutrient requirements of a specific location in an agricultural field comprising:

harvesting a crop from said specific location;

evaluating, automatically and via an electromechanical optical device, at least one property of said crop contemporaneously and continually with the havesting process, said evaluating occurring on the move and in real-time;

correlating, automatically via a computer, said evaluation between the qualities of the crop and the specific location of the crop in the agricultural field where harvested; and converting, from the crop itself, at least one of the properties measured from the harvesting of the crop into a nutrient requirement for future fertilizing or improvement of said location in said agricultural field, said converting allowing a user to ascertain nutrient content and requirements in a single consolidated method particularized to a specific agricultural field, thus providing substantially greater fertilizer accuracy for that agricultural field automatically transacting with said crop from said harvest environment based on said at least one property through an electronic link with said marketplace.

7. The method of claim 6 wherein said evaluating comprises real-time measurement of at least one crop property.

8. The method of claim 6 wherein said correlating comprises real-time location measurement.

9. The method of claim 6 wherein said at least one property comprises a protein content.

10. The method of claim 6 wherein said converting comprises calculating a nitrogen requirement.

11. The method of claim 6 further comprising compiling a plurality of said properties related to specific locations into a location-specific nutrient requirement map.

12. The method of claim 6 further comprising selectively applying nutrients to a field, in a location-specific manner based on said nutrient requirement.

13. An apparatus for harvesting and transacting the simultaneous sale of a crop, said apparatus comprising:

a crop harvesting apparatus;

an automatic, real-time crop evaluation device;

a computing device;

a direct wireless communications link between the computing device and a market;

wherein at least one property of said crop is evaluated contemporaneously and continuously on the move and with the harvesting of the crop, and wherein said evaluation device reports said evaluation to said computing device;

wherein said computing device automatically transmits to a market directly through said wireless communications link said property to interested parties in the market contemporaneously with the harvesting of the crop;

wherein said computing device automatically transacts for a sale of the harvested crop; and wherein said computing device and said communications link, after completing a sale, indicate to the user of the harvesting mechanism the final destination for the crop as it is being harvested.

14. The apparatus of claim 13 wherein said crop is output to a specific container based on said destination.

15. A system for transacting a sale of a crop comprising:

a crop harvesting device;

a real-time crop evaluating device coupled with said harvesting device for substantially and continuously evaluating at least one property of said crop while on the move during the harvesting process;

a communications and computing device located on said harvesting device said communications and computing devices being capable of automatically communicating, without human intervention, at least one property of the crop being harvested and receiving a purchase order for said crop; and at least one computerized crop buying device, remote to said harvesting device, said at least one crop buying device being in direct communications with the computing device onboard the harvesting device so that a buyer operating said computerized crop buying device is continuously aware of at least one property of the crop being harvested so that said buyer is able to make an informed purchasing decision and communicate the purchasing decision directly to the computing device on said harvesting device.

16. A communications network for communicating between a harvest environment directly to a marketplace said network comprising:

a crop harvesting device;

a real-time crop evaluating device coupled with said harvesting device for evaluating at least one property of said crop contemporaneously and while on the move with the harvesting of said crop;

a communications and computing device located on said harvesting device and coupled to said real-time evaluating device, said communications and computing device being capable of directly communicating, without human intervention, the said at least one property of the harvested crop to a crop buying device and directly and without human intervention receiving a request to purchase said crop; and at least one computerized crop buying device, remote to said harvesting device, said at least one crop buying device being in direct and uninterrupted communication with said communications and computing device, such that said a buyer operating said at least one crop buying device is aware of said at least one property, thus enabling said buyer to make an informed purchase decision and communicate, directly through the computing device, a purchase request.

* * * * *